W. A. WOOD.
Harvester.

No. 212,528.   Patented Feb. 18, 1879.

Witnesses.
Franck L. Ouraud.
Alexander Mahon.

Inventor.
Wm. Anson Wood
by A. M. Smith
Attorney.

W. A. WOOD.
Harvester.

No. 212,528. Patented Feb. 18, 1879.

Witnesses.
Franck L. Ouraud
Alexander Mahon

Inventor.
Wm Anson Wood
by A. M. Smith
Attorney.

UNITED STATES PATENT OFFICE.

WILLIAM ANSON WOOD, OF ALBANY, ASSIGNOR TO FRANK WOOD, OF HOOSICK FALLS, NEW YORK.

IMPROVEMENT IN HARVESTERS.

Specification forming part of Letters Patent No. 212,528, dated February 18, 1879; application filed March 20, 1878.

*To all whom it may concern:*

Be it known that I, WILLIAM ANSON WOOD, of Albany, county of Albany, State of New York, have invented certain new and useful Improvements in Reaping-Machines, of which the following is a full, clear, and exact description, reference being had to the accompanying drawings, making part of this specification, in which—

Figure 1:
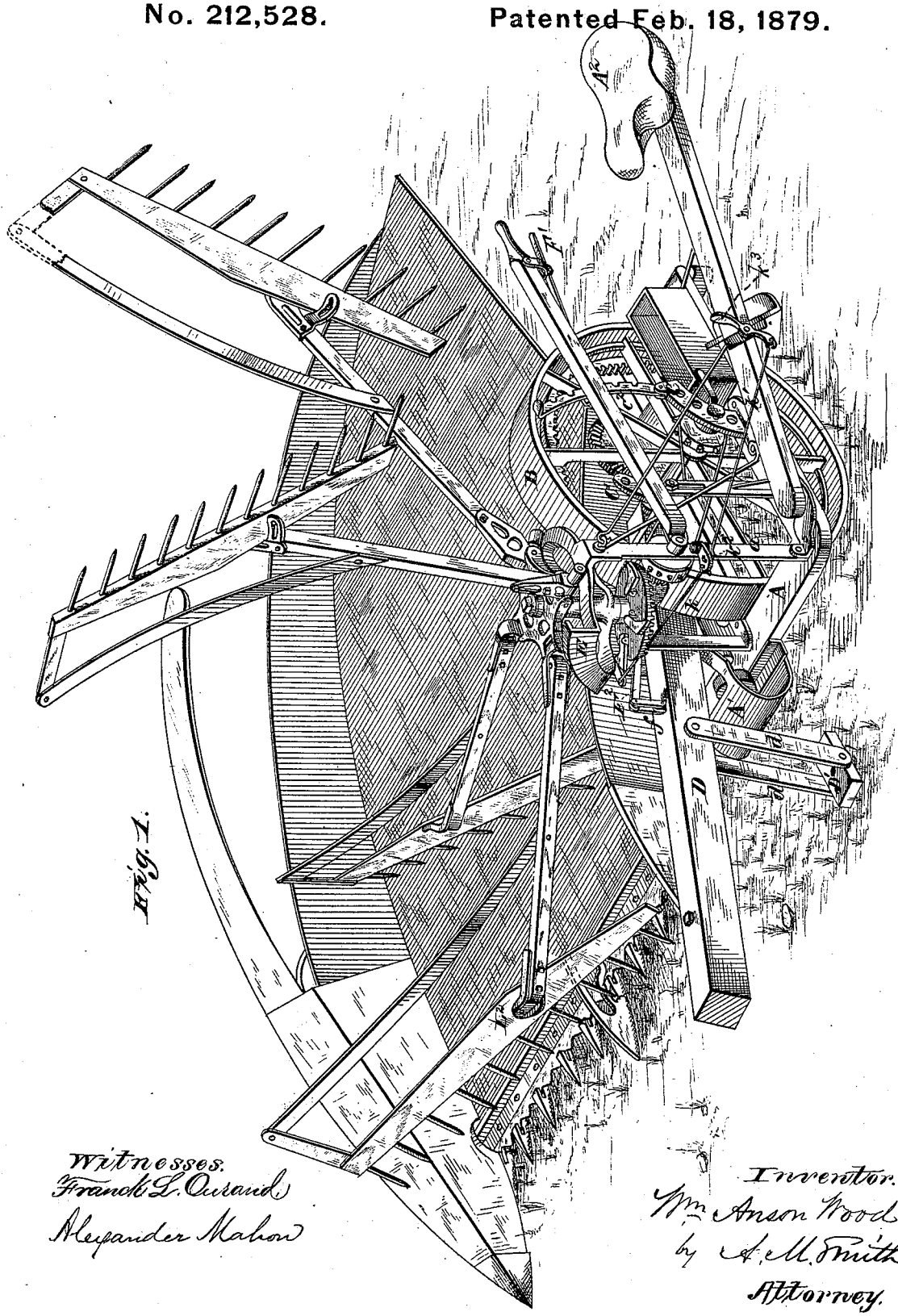
Figure 2:
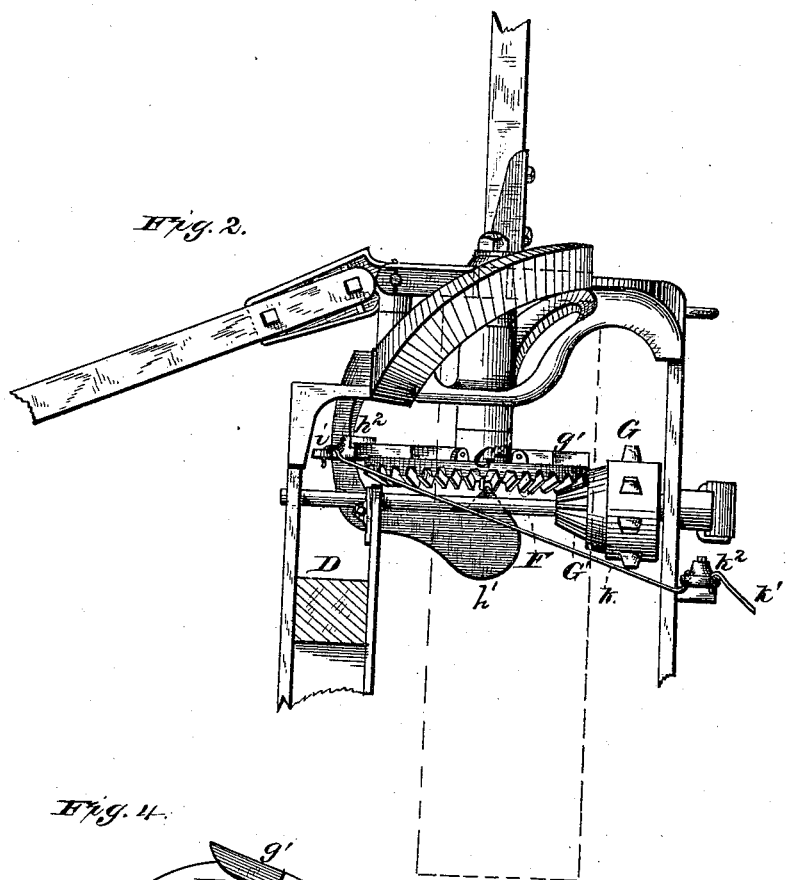
Figure 4:
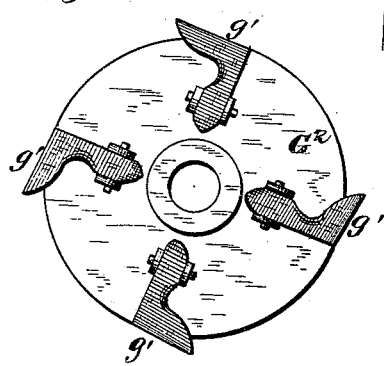
Figure 5:
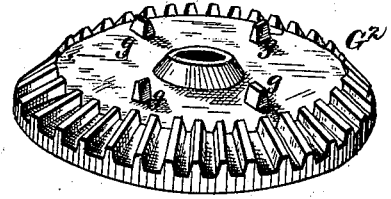
Figure 5:
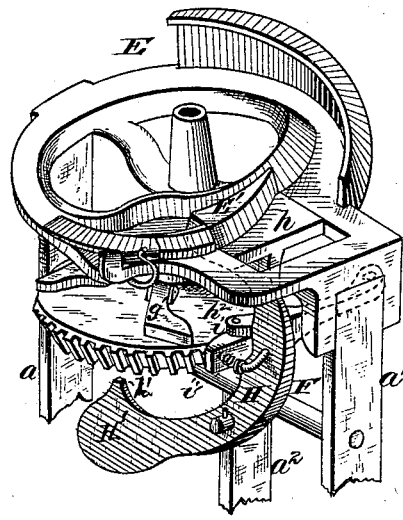
Figure 8:
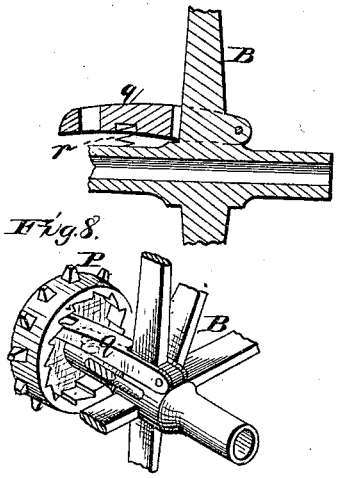
Figure 6:
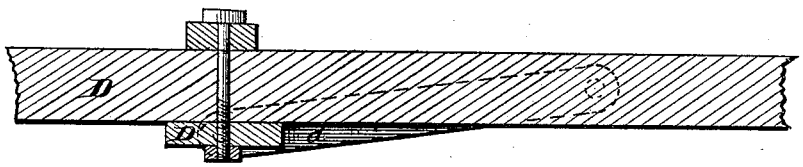
Figure 7:
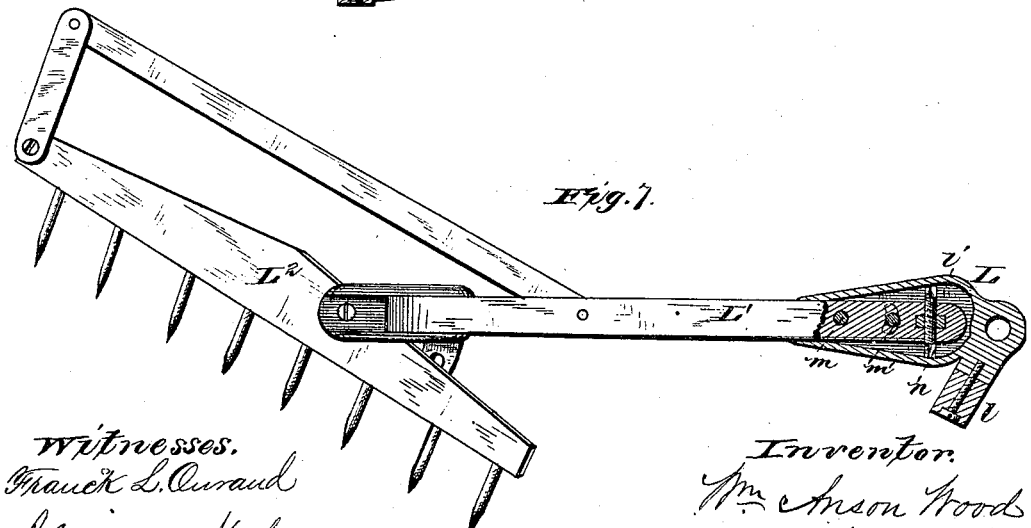

Figure 1 is a perspective view of a reaping-machine embracing my improvements. Fig. 2 is a front elevation of the rake mechanism. Fig. 3 is a perspective view of the devices for controlling the path of the rake and reel arms. Fig. 4 is a plan or top view of the crown or bevel wheel on the rake-shaft and of the dogs pivoted thereto. Fig. 5 is a perspective view of said wheel, showing its lower face. Fig. 6 is a section through the tongue and dog or jack, showing the position of the latter when the machine is in operation. Fig. 7 is a front elevation of one of the rake-arms, partly in section, showing the manner of adjusting the arm in its socket; and Fig. 8 shows, by detail views, the backing-ratchet, connecting the rake-driving sprocket-wheel with the drive-wheel.

Similar letters of reference denote corresponding parts wherever used.

The invention relates, first, to a novel arrangement of the rake-stand and mechanism relative to the main frame and driving-wheel; secondly, to a novel arrangement of dog or jack, in connection with the tongue of the machine, for dogging the machine and adapting the frame and cutting apparatus to be adjusted; thirdly, to a novel arrangement of means for rocking the frame and varying the height of cut when the machine is in operation; fourthly, to the arrangement of the switch or gate of the cam-track for changing the path of the rake and reel arms, and to the means for operating and controlling said gate; and, fifthly, to the means for adjusting the rake in its elbow or socket iron.

The machine in its general outline and organization is similar to machines in use, and will therefore be described in detail only so far as is necessary to an understanding of my improvements.

In the accompanying drawings, A represents the main frame, surrounding the driving-wheel B, which rotates on a stationary axle, adjustably connected with the frame through perforated curved standards C C', the former of which is formed upon or rigidly connected with a metal gear-frame, bolted to the main frame on the inner side of the drive-wheel, and the latter, C', is bolted directly through a flange or foot to the outer longitudinal bar of the main frame, as shown.

The tongue D is pivoted in the metal gear-frame referred to at a point at or near the line of the drive-wheel axle, and extends forward between two of the uprights of the rake-frame, which serve to steady its movements and prevent swaying or lateral movement; and at a point in advance of the main frame the tongue has a forked link, or two parallel links, *d d*, pivoted to it, the lower or forward ends of which are united by a pivoted block, D'. This block, when the machine is at rest, or when the main frame or any part of the machine is to be adjusted, is let down upon the ground in position shown in Fig. 1, with the links resting against the shield A¹, protecting the crank-wrist, in doing which it is necessary to elevate the forward end of the tongue considerably above the position it assumes when the machine is at work.

In this position the link and block not only serve to effectually dog the machine and prevent its forward movement, but any forward movement of the team, by drawing down on the tongue, will instantly raise the drive-wheel off the ground, and thus prevent its being rotated, the links and block D' acting as a fulcrum for that purpose, thus removing a frequent cause of accident. In this position, also, by bearing down upon the forward end of the tongue, the latter, in connection with the links and block D', becomes a jack, by means of which the main frame can be readily adjusted for setting the axle at different points in the perforated standard C C', as the nature of the work may require.

When the machine is at work, the block D' and links are folded up under the tongue, as shown in Fig. 6, where they may be held and carried either by a nut or key securing it to the lower end of the whiffletree-bolt, or by any suitable hook or other device for the purpose.

The rake-cam E is bolted directly to the upper ends of two uprights, $a$ $a^1$, secured to the forward transverse bar of the main frame in advance of the drive-wheel, and on opposite sides thereof, in such manner as to bring the rake and reel shaft directly in front of the drive-wheel, as shown in Fig. 2. These uprights are strengthened by inclined braces, extending from their upper ends backward and downward to the main or gear frame, as shown. A third upright, $a^2$, extends upward intermediate between the uprights $a$ $a^1$, and serves as a point of support for the weighted gate or cam-switch lever, affording also an additional bearing for the bevel and sprocket-wheel shaft F, mounted in the standards $a$ $a^1$.

The sprocket-wheel G and the bevel-wheel $G^1$, connected therewith, for driving the bevel or crown wheel $G^2$ on the rake-shaft, rotate loosely on the shaft F, adapting the latter to be rocked in its bearings independently of the movements of said wheels, and thus, in connection with an adjusting-lever, $F^1$, and a crank-arm, $F^2$, connected by a link, $f$, with the pivoted tongue, adapting it to be used as a means for adjusting the height of cut, and obviating the necessity for a separate shaft for that purpose.

The lever $F^1$ is attached to the outer end of the shaft F, and extends back within convenient reach of the driver in his seat $A^2$, and is held at any desired point of adjustment by a thumb-latch engaging with a rack-bar, $c^2$, pivoted to the upper end of the standard $c^1$, as shown.

The switch or gate portion E′ of the cam E, for changing the path of the rake and reel arms, is formed upon or secured to a sliding plate, $h$, moving in and out in ways in the cam-frame, and secured to the upper end of a weighted bell-crank or bent lever, H, pivoted at or near midway of its length in the upright $a^2$. The lower or horizontal arm, H′, of this lever is weighted in such manner as, when not operated upon by devices hereinafter described, to hold the gate in against the inner wall of the cam, as shown in Fig. 3, causing all the arms of the rake and reel to act as reel-arms; and the upper face of this weighted arm is provided with a spur or tooth at $h'$, which, in case the weight should be insufficient from any cause, such as being obstructed by straw or dirt, from moving the gate inward, as described, will be struck by one of a series of spurs, $a$, on the lower face of the bevel-wheel $G^2$, corresponding in number to the number of rake and reel arms, and will thus be forced downward, causing the gate to assume the position named.

The lever H, above its pivotal point, has a horizontal lever, $i$, crossing its inner face, with its rear end held inward by a small spring, $i'$, thereby throwing the forward end of the lever outward, out of contact with a series of dogs, $g'$, pivoted upon the upper face of the bevel-wheel $G^2$. (See Figs. 3 and 4.) This lever is pivoted to and just below a cam-ledge, $h^2$, on the inner face of lever H, and with which the dogs move in contact, for forcing the upper end of the lever, and with it the gate E′, outward, when not thrown upward, as hereinafter explained.

The forward end of lever $i$ is made, on its upper face, in the form of an inclined plane, the rear shoulder of which terminates at the forward end of ledge $h^2$, and in the same plane with its upper face, in such manner that when said end is forced inward, overcoming the tension of spring $i'$, the pivoted dogs $g'$ will ride up over said incline and pass over the ledge $h^2$ without acting thereon, and consequently without acting on the gate E′. The lever $i$ is controlled by the attendant in his seat through the medium of links $k$ $k^1$ and an intermediate lever, $k^2$, connecting it with a treadle-lever, $k^3$, attached to the driver's foot-board.

In practice, dogs $g'$ are applied to the face of wheel $G^2$, corresponding to the number of arms it is desired to have act as rake-arms, and then when, from any cause, it is desired to have the arm thus adapted to act as a rake-arm made to act as a reel-arm, the attendant can cause it so to act by simply pressing on the treadle $k^3$, thereby drawing inward the lever $i$ and throwing up the dog $g'$, as explained.

The socket-piece or elbow L, in which the rake-arm $L^1$ is secured, and one arm of which is provided with the friction-roller $l$, which travels over the controlling-cam E, has the socket $l'$, in which the rake-arm is secured, expanded in width at its inner end, to permit a slight adjustment of the end of the rake-arm, while the outer end of said socket is contracted to about the width or thickness of the rake-arm, as shown in Fig. 7.

The arm or rake-stale $L^1$ is pivoted near the outer end of the socket by a bolt, $m$. A second bolt, $m'$, passing through a slot in the socket-piece, permits the slight adjustment required for said arm on the pivot $m$, while it serves to prevent lateral play between the parts. The inner end of arm $L^1$ is provided with a female screw, and a screw, $n$, passing through the same, abuts at its ends against the opposite walls of the socket $l'$, which prevents endwise movement of the screw; consequently, when the screw is turned by a wrench or key applied to either of its projecting ends, the inner end of the rake-arm is moved up or down in its socket for adjusting the rake $L^2$, as required.

The bevel-wheel on the rake-shaft, as above explained, is driven by a bevel-wheel, $G^1$, and sprocket-wheel G, or its equivalent, revolving loosely on the shaft F; and these—that is, wheels G $G^1$—are in turn driven by an endless chain or other suitable connecting-gear from a flanged wheel, P, mounted loosely on the stationary drive-wheel axle. (See Fig. 8.)

The inner face of the flange of wheel P is made in ratchet form, with the square shoulders of the ratchet-teeth adapted to engage with a pawl, $q$, pivoted upon the hub of the drive-wheel when the latter is moving forward, said pawl being upheld by a spring, $r$, which allows the pawl to yield readily, and to pass over the inclined faces of the teeth without rotating the wheel P when the machine is backed.

By this simple and compact arrangement of parts the rake is thrown out of action when the machine is backed, and all danger of breaking any of its parts is obviated, while the action of the rest of the machine, for clearing the cutters, &c., is not interfered with.

From the foregoing description, it will be seen that a compact arrangement of the raking mechanism relative to the machine is secured, and at the same time, by the location of the rake stand and shaft upon the vibrating main frame in front of the driving-wheel, its weight is thrown directly and almost entirely upon said wheel, instead of on the platform and grain-wheel, as these machines are ordinarily constructed, the arrangement being such, also, as to secure the advantages of a front cut with a platform having a delivery of the gavels in rear of the main frame and driving-wheel.

Parts of the machine and raking apparatus not particularly described may be constructed in any usual or preferred manner.

Having now described my invention, what I claim as new, and desire to secure by Letters Patent, is—

1. The rake stand and shaft of a combined rake and reel arranged on the vibrating main frame in front of the single driving-wheel, in combination with a platform having a rear delivery, substantially as and for the purposes described.

2. The combination, with the pivoted tongue and adjustable main frame, of the dog or jack D', substantially as and for the purposes described.

3. The rock-shaft F, on which the rake-driving bevel-wheel is mounted, in combination with the pivoted tongue and adjusting-lever, for adjusting the vibrating main frame, as described.

4. The reciprocating cam switch or gate E', mounted upon and controlled by the weighted lever H, substantially as described.

5. The weighted lever H, on which the cam switch or gate is mounted, provided with the cam-ledge $h^2$, in combination with the pivoted dogs $g'$, on the rake-driving wheel $G^2$, substantially as and for the purpose set forth.

6. The combination, with the gate-lever H, having the cam-ledge $h^2$, of the lever $i$, having the inclined way for controlling the pivoted dogs $g'$, as described.

7. The lever $i$, attached to the cam-lever H, and provided with the inclined end or way, as described, in combination with the spring $i$, for holding said lever out of contact with the dogs $g'$ except when controlled by the attendant, as described.

8. The gate-lever H, provided at its weighted end with the tooth or spur $h^1$, in combination with the teeth $g$ on the rake-driving wheel G, arranged and operating substantially as described.

9. The rake arm or stale $L^1$, made adjustable in the socket-piece or elbow L, in combination with the adjusting-screw $n$, arranged and operating substantially as described.

WM. ANSON WOOD.

Witnesses:
 WM. R. DORLON,
 E. B. LAYTON.